US006766494B1

(12) United States Patent
Price et al.

(10) Patent No.: US 6,766,494 B1
(45) Date of Patent: Jul. 20, 2004

(54) METHOD AND SYSTEM FOR CREATING AD-HOC LINKS FROM FREE-FORM INK

(75) Inventors: Morgan N. Price, Palo Alto, CA (US); William N. Schilit, Menlo Park, CA (US); Gene Golovchinsky, Palo Alto, CA (US); Kenton P. A. O'Hara, Cambridge (GB); Abigail J. Sellen, Cambridge (GB); Bernard M. Mont-Reynaud, Mountain View, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/094,730

(22) Filed: Jun. 15, 1998

(51) Int. Cl.[7] ................................................ G06F 7/00
(52) U.S. Cl. ................................ 715/513; 715/512
(58) Field of Search ............................... 707/501, 502, 707/512, 513, 530, 531, 541; 345/156, 326

(56) References Cited

U.S. PATENT DOCUMENTS

| | | | | |
|---|---|---|---|---|
| 5,517,578 A | * | 5/1996 | Altman et al. | 382/181 |
| 5,539,427 A | * | 7/1996 | Bricklin et al. | 345/622 |
| 5,564,005 A | * | 10/1996 | Weber et al. | 345/326 |

(List continued on next page.)

FOREIGN PATENT DOCUMENTS

EP   0 866 397 A1   9/1998

OTHER PUBLICATIONS

Flexible, Space–Time Segmenter for Handwritten Words, vol. 29, No. 11, p. 4887–4889, Apr. 1, 1987.*
Laura Lemay's Workshop Microsoft Frontpage 98, SAMS. net, Nov. 1997, p. 150–160.*
Marquee: A Tool For Real–Time Video Logging, Weber et al., In Proceedings of CHI '94, ACM Press pp. 58–64, (1994).
Scribbler: A Tool For Searching Digital Ink, Poon et al., CHI '95 short paper, (1991).
Shared Web Annotations As A Platform For Third–Party Value–Added Information Providers: Architecture Protocols, And Usage Examples, Roscheisen et al., Technical Report STAN–CS–TR–97–1582, Stanford Integrated Digital Library Project, Computer Science Dept., Stanford University (1995). p. 252–253.
The Power of PenPoint, Carr et al., Addison–Wesley, Inc. (1991).
Dynomite: A Dynamically Organized Ink and Audio Notebook, Wilcox et al., In Conference Proceedings of CHI '97, ACM Press, pp. 186–193 (1997).
Dolphin: Integrated Meeting Support Across Local and Remote Desktop Environments and Live Boards, Streitz et al., In Proceedings of the Conference on Computer Supported Cooperative Work, pp. 345–358 (1994).
The Usability of Scribble Matching, Frohlich et al., CHI '96 short paper, (1996), p. 189–190.

Primary Examiner—Stephen S. Hong
Assistant Examiner—Cesar B Paula
(74) Attorney, Agent, or Firm—Oliff & Berridge, PLC

(57) ABSTRACT

The reading and writing system enhances free-form ink annotating and note taking by creating links between passages in response to free-form ink. The reading and writing system generates links between free-form ink anchors and also generates links between documents in different windows when a free-form ink stroke extends across window boundaries. The reading and writing system also removes a link when the free-form ink stroke representing the link is erased. The reading and writing system will display the ink anchors in a display showing all related linked anchors with their surrounding context when a corresponding link is selected.

24 Claims, 13 Drawing Sheets

U.S. PATENT DOCUMENTS

| | | | | |
|---|---|---|---|---|
| 5,596,700 A | * | 1/1997 | Darnell et al. | 345/340 |
| 5,666,139 A | * | 9/1997 | Thielens et al. | 345/173 |
| 5,724,985 A | * | 3/1998 | Snell et al. | 600/510 |
| 5,734,882 A | * | 3/1998 | Lopresti et al. | 707/200 |
| 5,806,079 A | * | 9/1998 | Rivette et al. | 707/512 |
| 5,809,317 A | * | 9/1998 | Kogan et al. | 715/501.1 |
| 5,815,830 A | * | 9/1998 | Anthony | 707/1 |
| 5,822,539 A | * | 10/1998 | Van Hoff | 709/236 |
| 5,831,615 A | * | 11/1998 | Drews et al. | 345/344 |
| 5,832,474 A | * | 11/1998 | Lopresti et al. | 707/2 |
| 5,913,221 A | * | 6/1999 | Kano et al. | 707/530 |
| 6,178,434 B1 | * | 1/2001 | Saitoh | 707/500 |
| 6,499,043 B1 | * | 12/2002 | Forcier | 715/541 |

* cited by examiner

METHOD AND SYSTEM FOR CREATING AD-HOC LINKS FROM FREE-FORM INK

BACKGROUND OF THE INVENTION

1. Field of Invention

This application is directed to a paper-like hypertext system that supports reading and browsing. In particular, the invention is directed to the creation of ad-hoc links between user-specified passages in documents using free-form ink annotations.

2. Description of Related Art

People use annotations and notes to organize information. Although annotations and notes serve the same purpose, there are many tradeoffs between marking on the document and marking in a separate place. Notes are concise to review, but take more effort to create. Notes have more context from the reader's ideas but less context from the document and short annotations are easy to create, but long annotations are awkward because space is limited.

Furthermore, people often organize their annotations and notes explicitly. Some writers use note cards, which can be flexibly sorted into different categories, to help them build connections between topics. Unfortunately, notecards require much effort to use. Information analysts often sort annotated paper into piles and some clip out useful sections with scissors and organize the clippings.

Once people reorganize information on paper, they often lose access to the original material. Notes are easier to work with than annotated documents, unless some information is missing. Similar problems arise with secondary notes and outlines that writers use to organize thoughts. There is a need for a free-form ink system that generates links between documents.

In Marquee, a real-time tool for video logging (*Marquee: A Tool For Real-Time Video Logging*, Weber et al., In Proceedings of CHI '94, ACM Press pp. 58–64, (1994) incorporated by reference herein in its entirety), a handwritten word could be circled to copy it to a palette of ink keywords, from which it could be dragged onto other pages. These ink keywords were later converted to text manually in order to support searching. Marquee, however, does not consider the shape of the ink keyword. Furthermore, Marquee's keywords do not act as links. Therefore, a user cannot select an instance of a keyword to view other instances of that keyword.

Although a later version of Marquee uses ink matching to highlight matching notes, ink matching was neither combined with the keywords nor used to create links (*Scribbler: A Tool For Searching Digital Ink*, Poon et al. CHI '95 short paper, (1995), incorporated by reference herein in its entirety). Other systems which have used ink matching have not supported links.

ConMentor supports ad-hoc linking and annotation on the Web. Users of ComMentor can annotate documents with a keyboard and a mouse, and can include them in a set by selecting from a list of sets (*Shared Web Annotations As A Platform For Third-Party Value-Added Information Providers: Architecture Protocols, And Usage Examples*, Roscheisen et al., Technical Report STAN-CS-TR-97-1582, Stanford Integrated Digital Library Project, Computer Science Department, Stanford University (1995), incorporated by reference herein in its entirety). ComMentor, however, does not support free-form ink.

GO PenPoint includes a pen-based interface for manual linking. A link gesture creates a "button" that points to the current page. The button can then be dragged to another page to complete the link (*The Power of PenPoint*, Carr et al., Addison-Wesley, Inc. (1991), incorporated by reference herein in its entirety). PenPoint supports free-form ink annotation but does not combine it with linking in any way. Co-Assigned U.S. patent application Ser. No. 08/929,426, filed Sep. 15, 1997, and incorporated herein in its entirety, discloses an active reading machine that creates links automatically from ink marks, but users do not have direct control over the target of the link. The system creates margin links and further reading lists that produce links via queries on the text, not ad-hoc links.

Co-assigned U.S. patent application Ser. No. 09/059,204, filed Apr. 14, 1998 and entitled "Method and Apparatus for Displaying References to a User's Document Browsing History within the Context of a New Document", incorporated by reference herein in its entirety. That invention extracts portions from previously read documents and compares those portions to passages in a new document. Those passages in the new document which are identified as being closely related to a portion of a previously read document are provided with a selectable link to the portion in the previously read document.

Another co-assigned U.S. patent application Ser. No. 08/929,427, filed Sep. 15, 1997 and incorporated by reference herein in its entirety, discloses a system that extracts portions of a document that have been annotated with free-form ink and presents the annotation with their surrounding context in a separate view called a reader's notebook. The reader's notebook creates a special view with links to annotations, which could be considered a multi-way link. Although users of this system can specify which classes of annotations appear in the view, users cannot include or exclude specific annotations from the set. Furthermore, the links are based on properties that a user explicitly assigns to the ink by selecting a pen, rather than on the shape of the ink.

Yet another co-assigned U.S. patent application Ser. No. 08/821,311, filed on Mar. 20, 1997 and incorporated by reference herein in its entirety, discloses a system called Dynomite. Dynomite uses an ink index that organizes free-form ink notes in the same way that the reader's notebook organizes annotations (*Dynomite: A Dynamically Organized Ink and Audio Notebook*, Wilcox et al., In Conference Proceedings of CHI '97, ACM Press, pp. 186–193 (1997), incorporated by reference herein in its entirety). Dynomite also allows users to assign keywords to pages, and all the notes on the pages with those keywords can be grouped together. However, as with the reader's notebook, a user cannot include or exclude specific annotations from these groups, and links are based upon properties associated with the ink rather than on the shape of the ink.

Dolphin creates links to new pages from annotations that are marked with a "box" gesture (*DOLPHIN: Integrated Meeting Support Across Local and Remote Desktop Environments and Live Boards*, Streitz et al., In Proceedings of the Conference on Computer Supported Cooperative Work, pp. 345–358 (1994), incorporated by reference herein in its entirety). These links are hierarchical, not ad-hoc. DOLPHIN does not allow users to specify arbitrary destinations for these links and treats a bookmark as a gesture and removes it after a link has been created.

The active reading machine disclosed in U.S. Patent Application Ser. Nos. 08/929,426, 08/929,427 supports reading and browsing over a wide variety of documents. Many of these documents were designed for presentation on paper and, therefore, lack hypertext links. One way to create a browsing environment is to automatically detect topics, references and other static document structure and then to generate the links automatically (*Automatic Hypertext Construction*, Allan J., Ph.D. Thesis, Cornell University (1995), incorporated by reference herein in its entirety). Unfortunately, only a small fraction of all possible links are useful to a particular reader at a particular time and deciding on the right links ahead of time, without any knowledge of a reader's activities, is difficult.

A system that gives readers the tools for constructing links should be more useful than statically generated computer links because they can reflect a reader's idiosyncratic interests. At the same time, link construction should not interfere with a reader's primary activity of reading. However, conventional systems do not provide these features.

SUMMARY OF THE INVENTION

The invention enhances free-form ink annotating and note taking by creating ad-hoc links from free-form ink. People can use ad-hoc links to connect notes and outline entries to sources, or to group together the important passages on a particular topic.

Linking by inking may have a number of advantages over traditional link construction interfaces. First, ink is personal and idiosyncratic. People can use the flexibility of free-form ink to make anchors meaningful. Second, linking by inking is an extension of current practice. Readers already use ink marks on post-it notes or colored stick-ons and other types of annotations to characterize information efficiently. Third, because linking by inking requires no explicit interaction, people can create links more quickly and easily than with traditional interfaces where people must invoke a command and then browse for the target of the link.

Readers often link documents together for their own particular reasons. One typical practice is to mark places on different pages with the same circled symbol (e.g., the letter "A" or numeral "1"), thereby creating a logical link between them. The present invention creates "ink anchors" to help readers create idiosyncratic many-to-many links with minimal effort. Circling any mark converts that mark into an anchor. In this way, the system of this invention maintains multi-way links between similar ink anchors.

Ink anchors require relatively little effort to create. Readers can create links without selecting from a list, navigating or typing text. Readers merely create and use their own personal marks for the ink anchors.

BRIEF DESCRIPTION OF THE DRAWINGS

The preferred embodiments of this invention will be described in detail, with reference to the following figures, wherein.

These and other features and advantages of this invention are described in or are apparent from the following detailed description of the preferred embodiments.

DETAILED DESCRIPTION OF PREFERRED EMBODIMENTS

Figure 1:
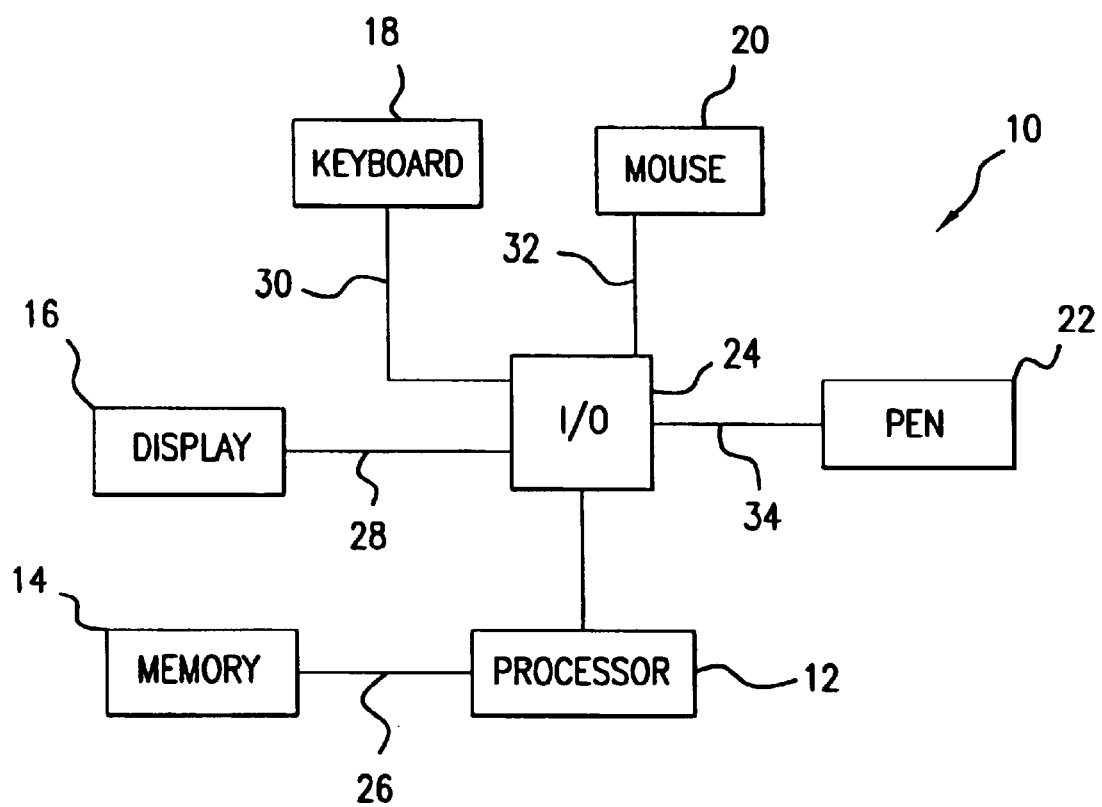
FIG. 1 is a block diagram of one embodiment of the electronic document reading system of this invention.

FIG. 1 shows one embodiment of an electronic active reading system 10 of this invention. The electronic active reading system 10 includes a processor 12 communicating with a memory 14 that stores the program, documents and other data for practicing the invention. The processor 12 also communicates to a display 16, keyboard 18, a mouse 20 and a pen 22 via input/output device 24. The keyboard 18, mouse 20, pen 22 and any other interface device (not shown) are operated by a user to control the operation of the electronic active reading system 10. The display 16 may be on a stand-alone pen computer or a tablet connected by a tether to a conventional computer.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowcharts shown in FIGS. 2 and 3 can be used to implement the system 10.

Additionally, as shown in FIG. 1, the memory 14 is preferably implemented using static or dynamic RAM. However, the memory 14 can also be implemented using a floppy disk and disk drive, a writable optical disk and disk drive, a hard drive, flash memory or the like. Additionally, it should be appreciated that the memory 14 can be either distinct portions of a single memory or physically distinct memories.

Further, it should be appreciated that the links 26, 28, 30, 32 and 34 connecting the memory 14, the display 16, the keyboard 18, the mouse 20 and the pen 22 to the processor 12 can be wired or wireless links to networks (not shown). These networks can be local area networks, wide area networks, intranets, the Internet, or any other distributed processing and storage networks.

Figure 2:
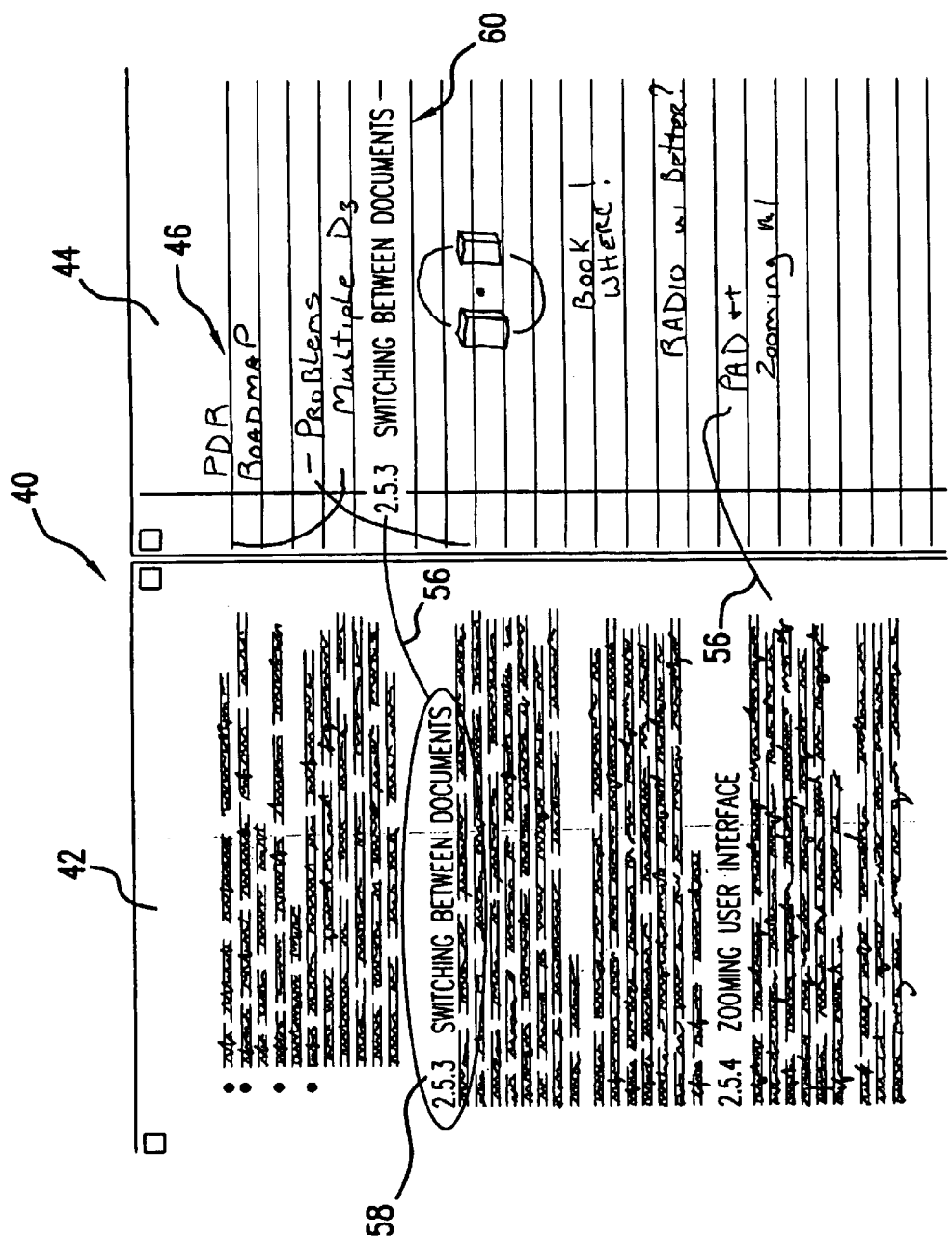
FIG. 2 shows a linked notebook view of this invention.

As shown in FIG. 2, the present invention creates ad-hoc links from free-form ink to create a "linked notebook" that allows people to connect together their annotations, notes and outlines. The linked notebook allows writers to move quickly between their sources and their notes. Writers can copy material from their source to their notes to speed up note taking and avoid transcription errors. The linked notebook can also copy notes onto source documents in case the writer needs to re-read that source later. Additionally, the linked notebook allows people to organize and re-organize their notes onto pages, much as they would on paper, but without the effort of manual transcription. The invention also allows links between passages within the same document.

Figure 3:
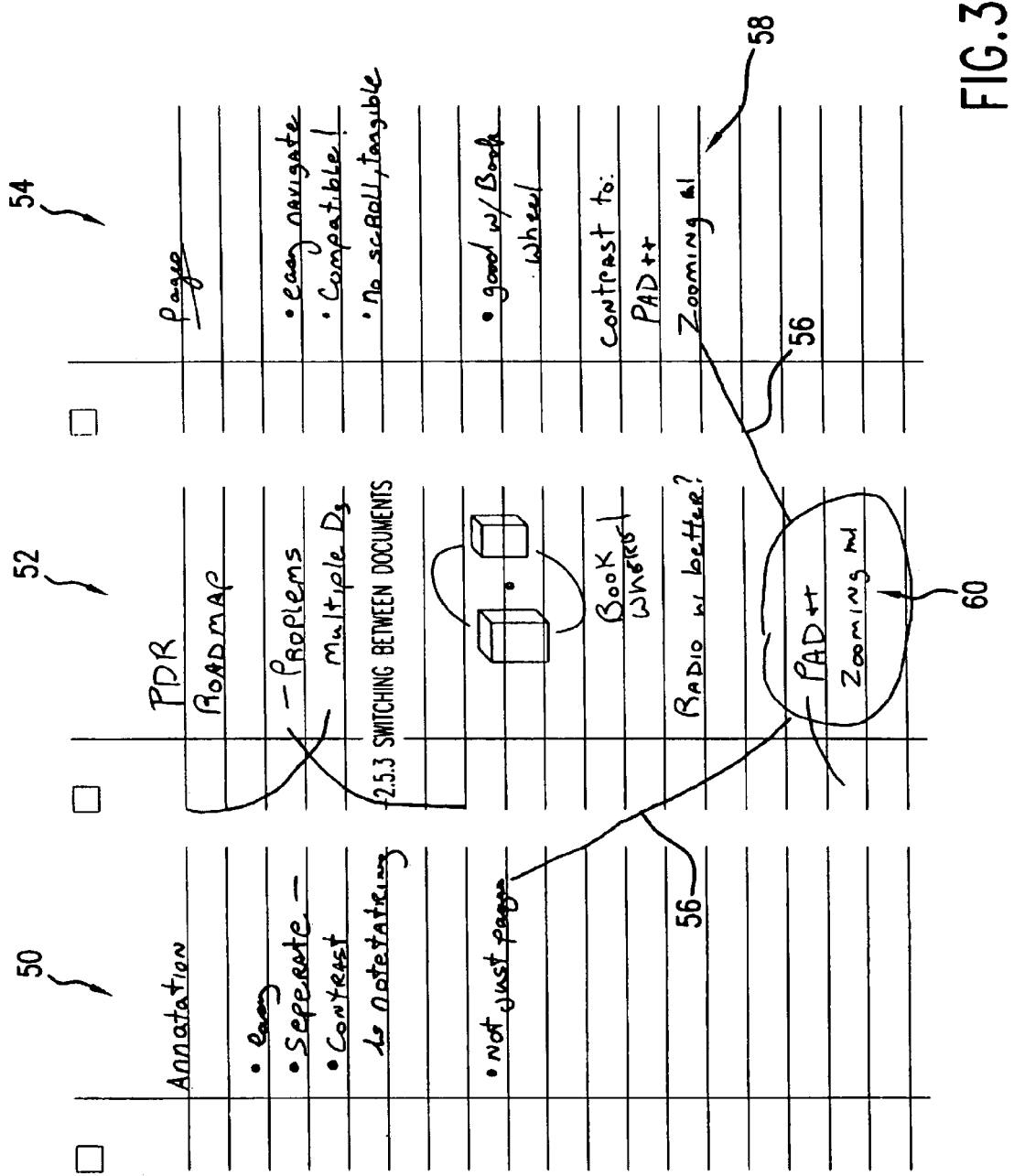
FIG. 3 shows another linked notebook view of this invention.

The linked notebook 40 displays a document 42 together with a notebook page 44. This allows a reader to take notes 46 much as they would on paper. The linked notebook can also display three notebook pages 50, 52 and 54 side by side as shown in FIG. 3. This provides a flexible way for people to prepare notes, transcribe notes onto pages on a particular topic, etc.

Users can build links 56 between documents simply by drawing a mark from a passage displayed in one window to a passage displayed in another window. Users can also copy text and ink from one document to another by circling and drawing a line to the destination. The copy 58 and the original 60 will be automatically linked together. Thus, annotations with surrounding text can be converted into notes. This is similar to the reader's notebook (discussed in the background), which lists clippings of annotated text, but here the presentation is directly under the user's control. People can also copy comments from the notebook onto the document (not shown).

Figure 4:
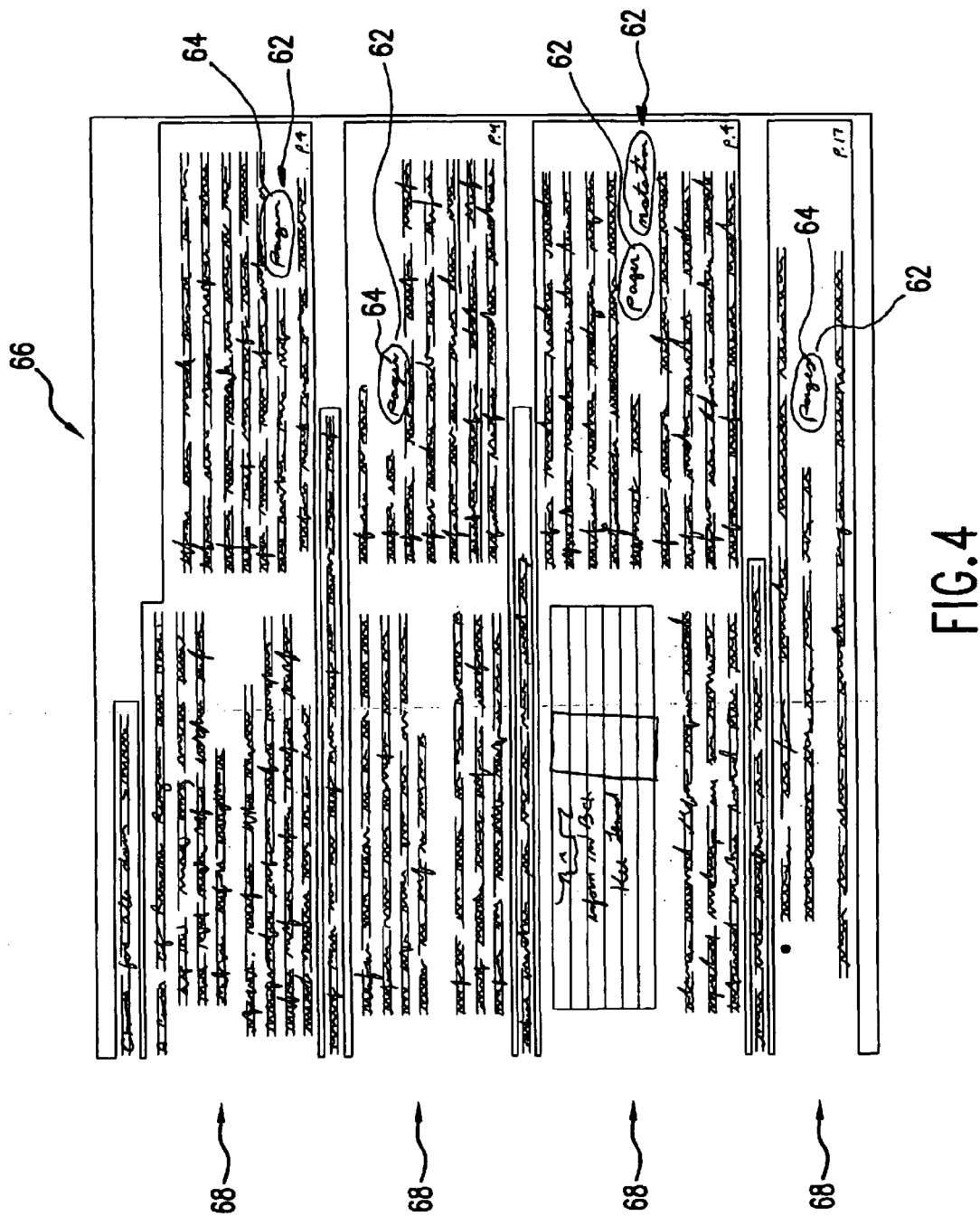
FIG. 4 shows a view of annotations-in-context for an ink anchor in accordance with this invention.

As shown in FIG. 4, the present invention also creates ad-hoc links from free-form ink to create ink anchors 62 which may be multi-way links between matching marks 64 to help people categorize their annotations and notes. Ink anchors 62 help readers create idiosyncratic many-to-many links with minimal effort. Circling any mark 64 converts that mark into an ink anchor 62. The system computes links between the ink anchors by grouping ink marks together that have similar morphological or spatial characteristics.

Ink anchors 62 require relatively little effort to create. Readers are able to create links without selecting from a list, navigating or by typing text. They merely need to recreate their own, personal marks, although readers may forget anchors that they use infrequently, this is preferable to alternatives such as presenting readers with a large number of choices every time they build a link.

As shown in FIG. 4, tapping on a source ink anchor 62 produces a list of clippings 66 that contain matching target ink anchors 62. This view 66 shows clippings of documents that correspond to annotations made by the reader. The clippings 68 include enough context to make the ink marks meaningful, but still present a concise view of the annotated documents.

Clippings 68 include nearby annotations, and therefore, may show multiple ink anchors 62 in the same clipping. This allows readers to observe connections between different sets of ink anchors 62 without following the links.

The present invention also helps a reader remember the "names" they have been using for the links by providing a list of clippings 68 over all ink anchors 62, sorted by time (not shown). A user preference provides that the view may only contain the most recent occurrence of each ink anchor 62.

The ink anchors of this invention may be implemented in an active reading machine that runs on Windows 95/NT, uses the Win 32 API, and is implemented in C++. The system of this invention can take over the entire display, and may avoid using Windows widgets. Instead, the system of this invention can display a small set of widgets, render them to an in-memory bitmap, rotate the bitmap, and copy it to a display device. In this way, the system of this invention can use a landscape device in portrait mode.

One embodiment of the system of this invention uses an "image plus text" file format. With this format, the system can handle most digital documents, and also documents that came to the user on paper. The text, inferred from print commands or from optical character recognition applied to the scanned image, is tied to the image by a bounding rectangle (in pixels) for each word. This text is intended to support information retrieval, but is not shown to the reader directly. In principle, the "image plus text" file format lets users load documents into the system of this invention easily, by "printing" or by scanning.

The system of the invention uses several data structures. An ink point is a two-dimensional coordinate. An ink stroke is a sequence of ink points and a location in a document such as a page number. An ink annotation database stores ink strokes with several operations such as add a stroke, remove a stroke and look up strokes corresponding to a region in a document. An ink anchor is one or more ink strokes, not including the ink anchor circle. An ink matching database stores ink anchors with several operations such as add an ink anchor, delete an ink anchor and look for an ink anchor which matches some ink strokes. A link target is a region in a document and one or more ink strokes. A link is an ink anchor and at least one link target. A link database stores links with several operations such as lookup a link corresponding to an ink anchor, lookup a link target that corresponds to a location in a document, lookup a link target that corresponds to a stroke and lookup a link that corresponds to a link target.

FIGS. 5A–7E show control routines for various procedures of the present invention. Each of the control routines may operate within another higher level control routine. While each of the control routines in FIGS. 5A–7E indicate that these control routines stop, it is to be understood that control may be returned to another or higher level control routine after that control routine stops.

Figure 5A:
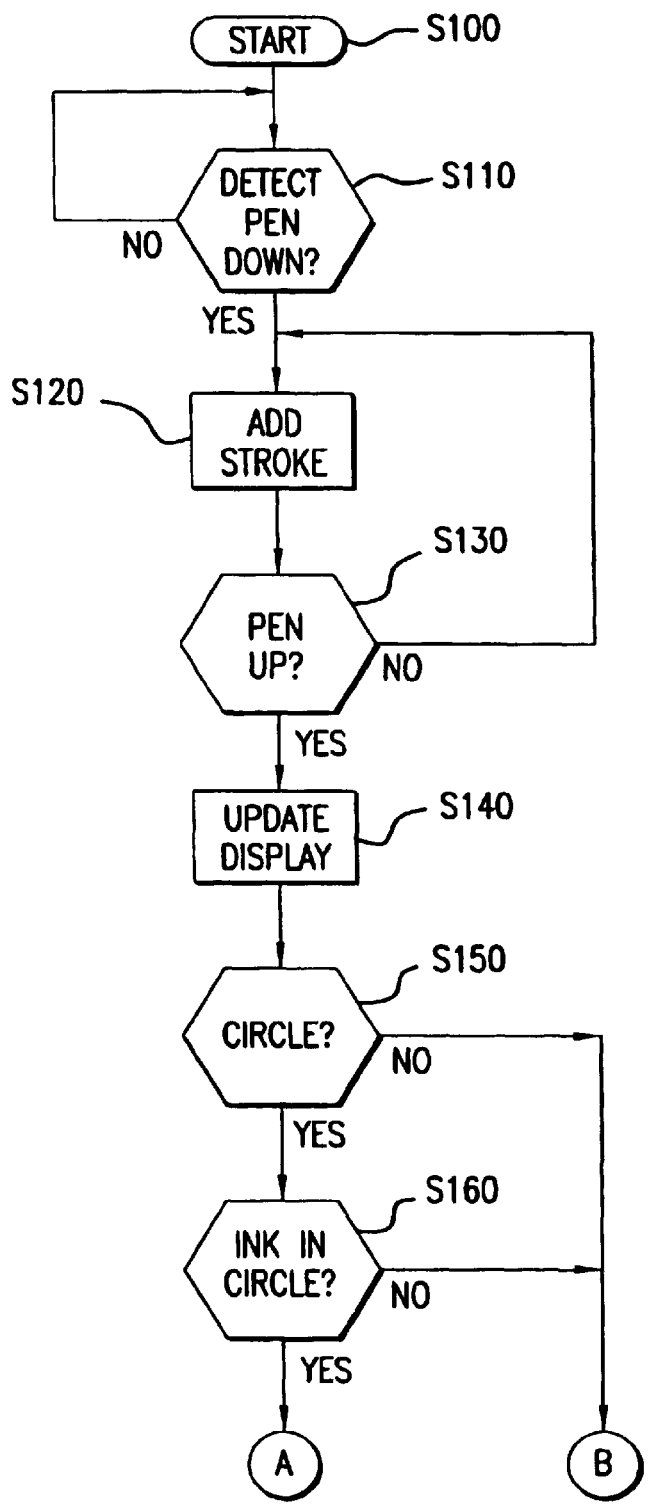
FIGS. 5A–5B is a flowchart outlining the control routine for generating ink anchors of one embodiment of a method of this invention.
Figure 5B:
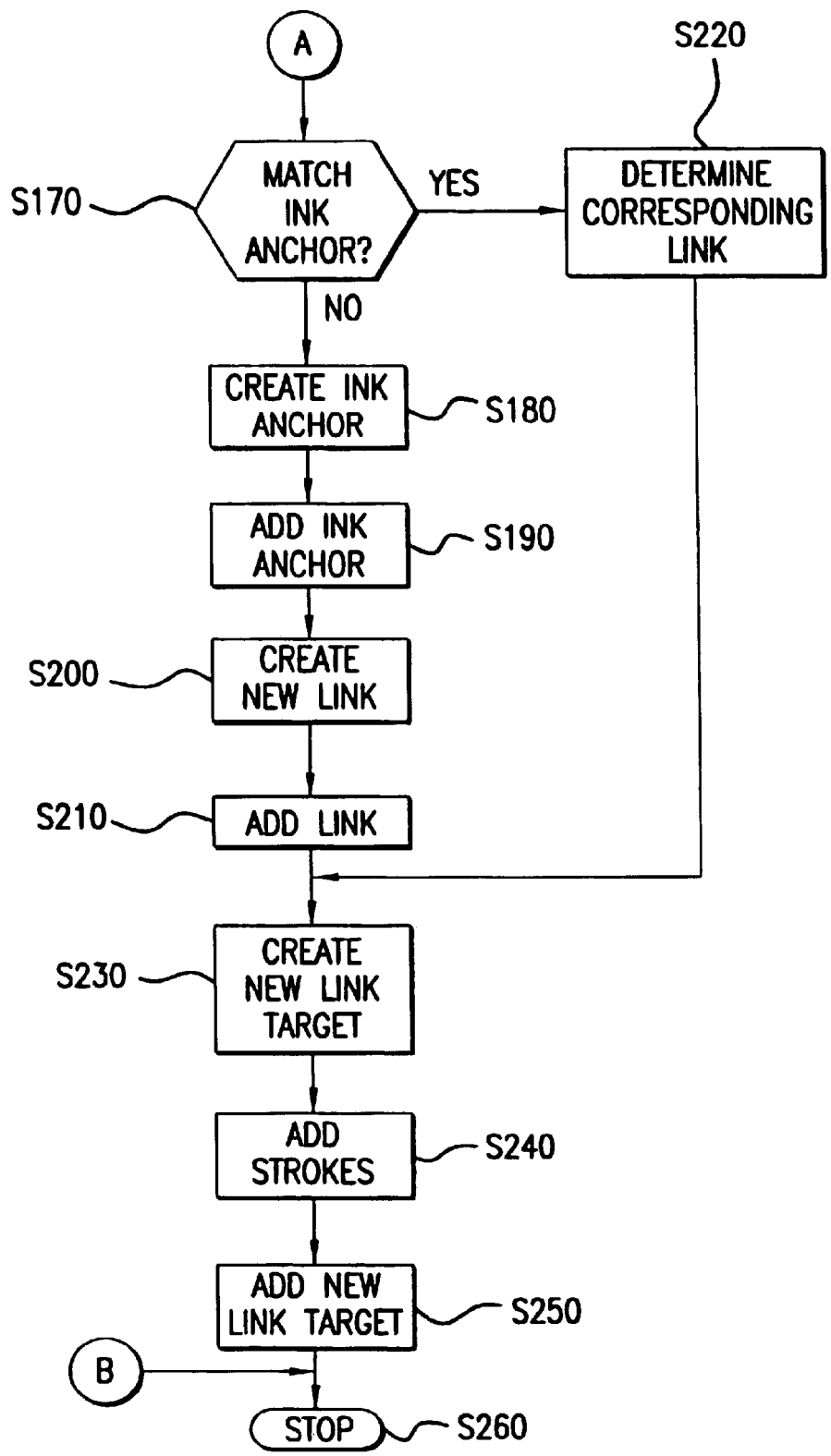

FIGS. 5A–5B show a flowchart of a control routine for creating a link. The control routine starts at step S100 and continues to step S110. In step S110, the control routine determines whether a "pen down" has been detected. If a "pen down" has not been detected the control routine returns to step S110. If a "pen down" has been detected, in step S110, the control routine continues to step S120.

In step S120, the control routine adds a stroke and continues to step S130. In step S130, the control routine determines if a "pen up" has been detected. If in step S130, a "pen up" has not been detected, the control routine returns to step S120. If in step S130, a "pen up" has been detected the control routine continues to step S140.

In step S140, the control routine updates the display to show the strokes that have been newly added. The control routine then continues to step S150, where the control routine determines whether the added stroke(s) includes a circle. If in step S150, the control routine determines that the added stroke(s) is not a circle, then the control routine jumps to step S260 where the control routine stops. If in step S150, the control routine determines that the added stroke(s) is a circle, the control routine continues to step S160.

In step S160, the control routine determines whether an ink stroke exists in the circle. If in step S160, the control routine determines that an ink stroke does not exist in the circle then the control routine jumps to step S260. If in step S160, the control routine determines that an ink stroke is in the circle then the control routine continues to step S170.

In step S170, the control routine determines whether there is a matching ink stroke inside the ink anchor circle in the ink matching database. The control routine compares the morphological or spatial characteristics to determine if a match exists. If in step S170, there is no matching ink stroke then the control routine continues to step S180.

In step S180, the control routine creates a new ink anchor and continues to step S190. In step S190, the control routine adds the new ink anchor to the ink matching database and continues to step S200. In step S200, the control routine creates a new link based upon the ink anchor and continues to step S210. In step S210, the control routine adds the new link to the link database and continues to step S230.

In step S170, if the control routine determines that a matching ink anchor exists then the control routine continues to step S220. In step S220, the control routine determines which link corresponds to the matching ink anchor and continues to step S230.

In step S230, the control routine creates a new link target and continues to step S240. In step S240, the control routine adds strokes to the new link target and continues to step S250. In step S250, the control routine adds the new link target to the link and continues to step S260 where the control routine stops.

The system of this invention follows a link by detecting a tap with a pen on a link target and looking up the link target that corresponds to the location of the tap using the link database. If the link database includes a link that corresponds to the location of the tap then the control routine of the system determines a corresponding link in the link database. The control routine then displays the list of link targets as "annotations in context" as is shown for example in FIG. 4. The user may then select a clipping of an annotation in context to view a particular link target.

A user can remove an unintended ink anchor by erasing the anchor. Therefore, the user can correct erroneous ink anchor matches by erasing the anchor, rewriting the ink, and circling it again.

Figure 6A:
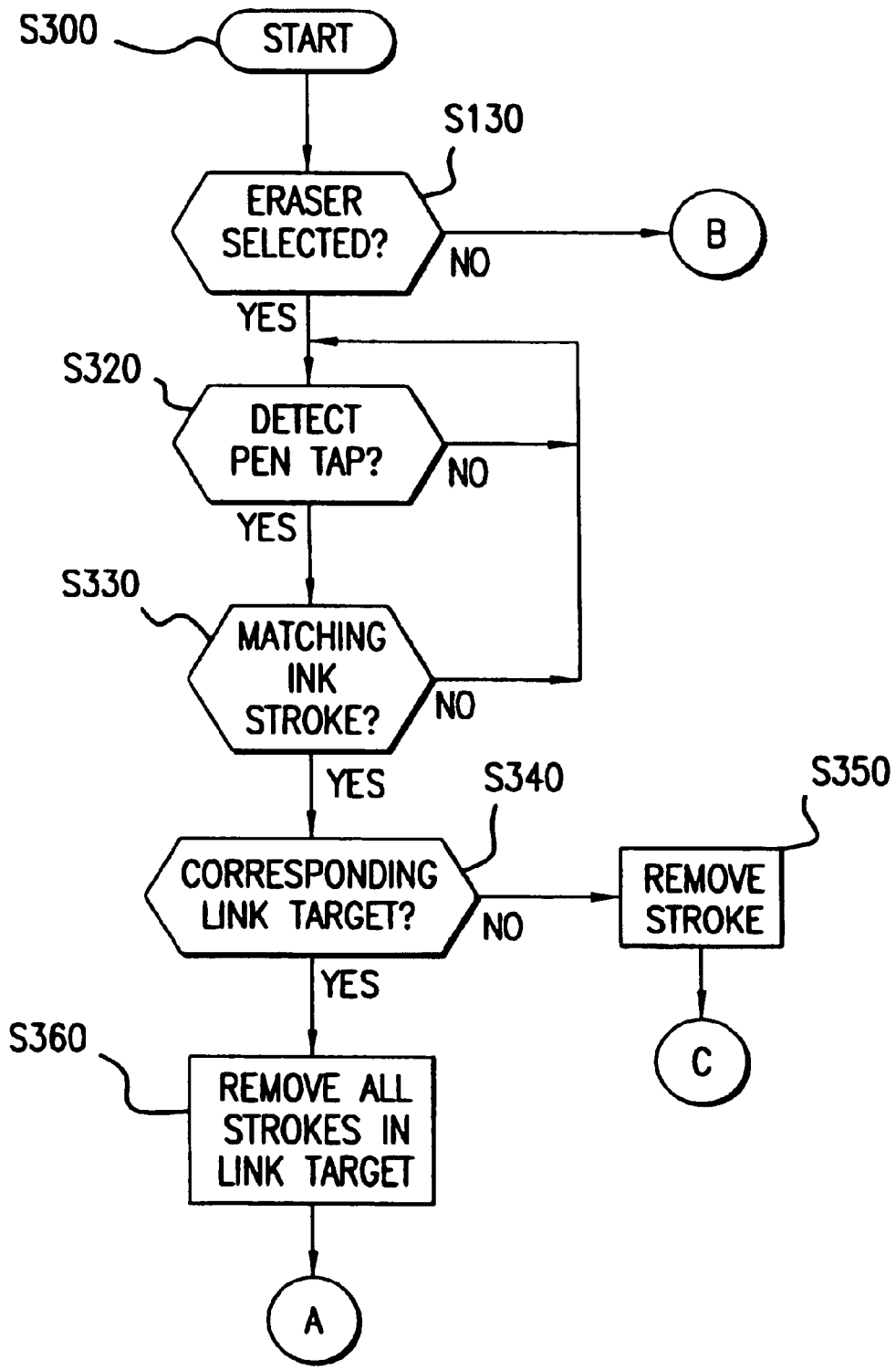
FIGS. 6A–6B is a flowchart outlining the control routine of an erasing and link removal method of one embodiment of this invention.
Figure 6B:
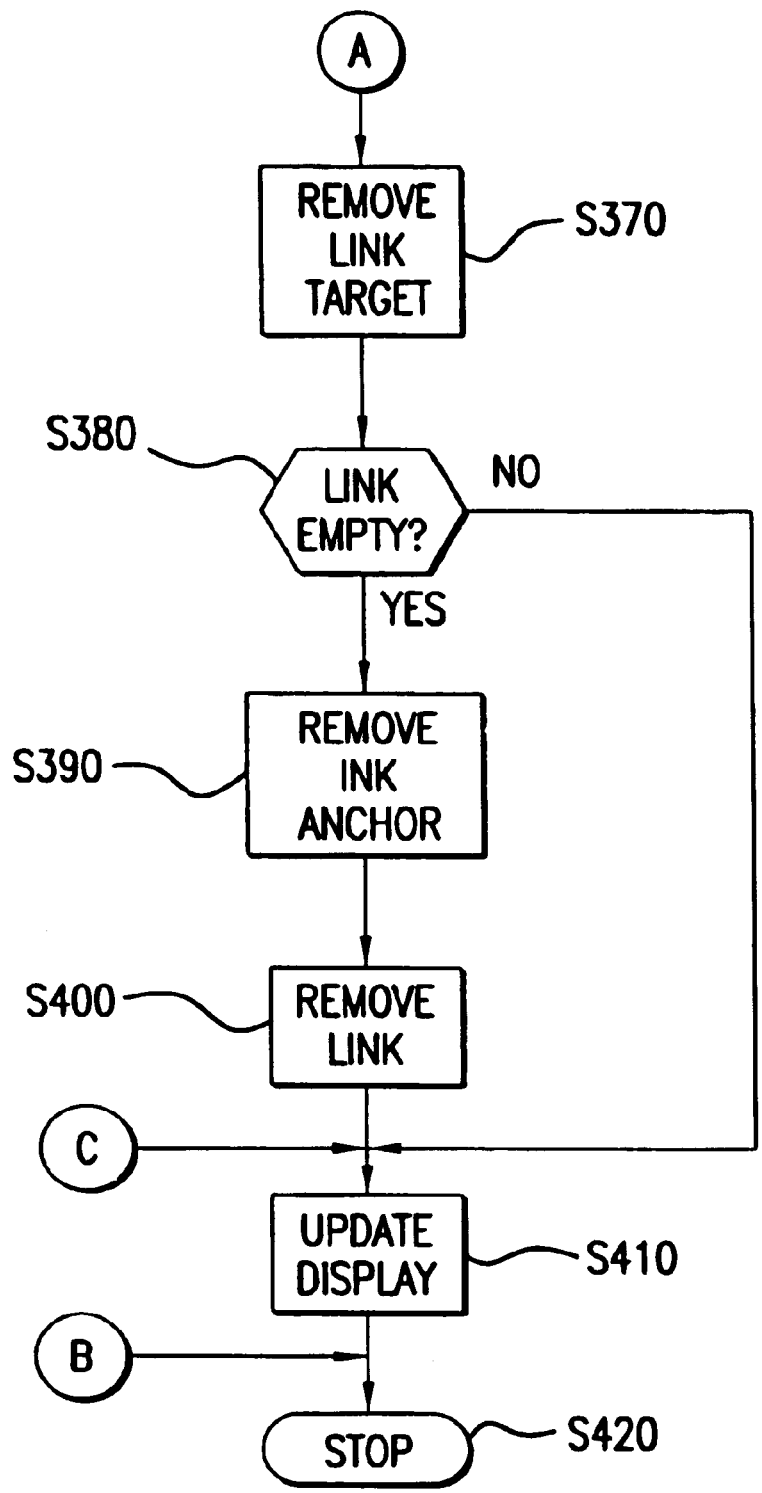
Figure 7A:
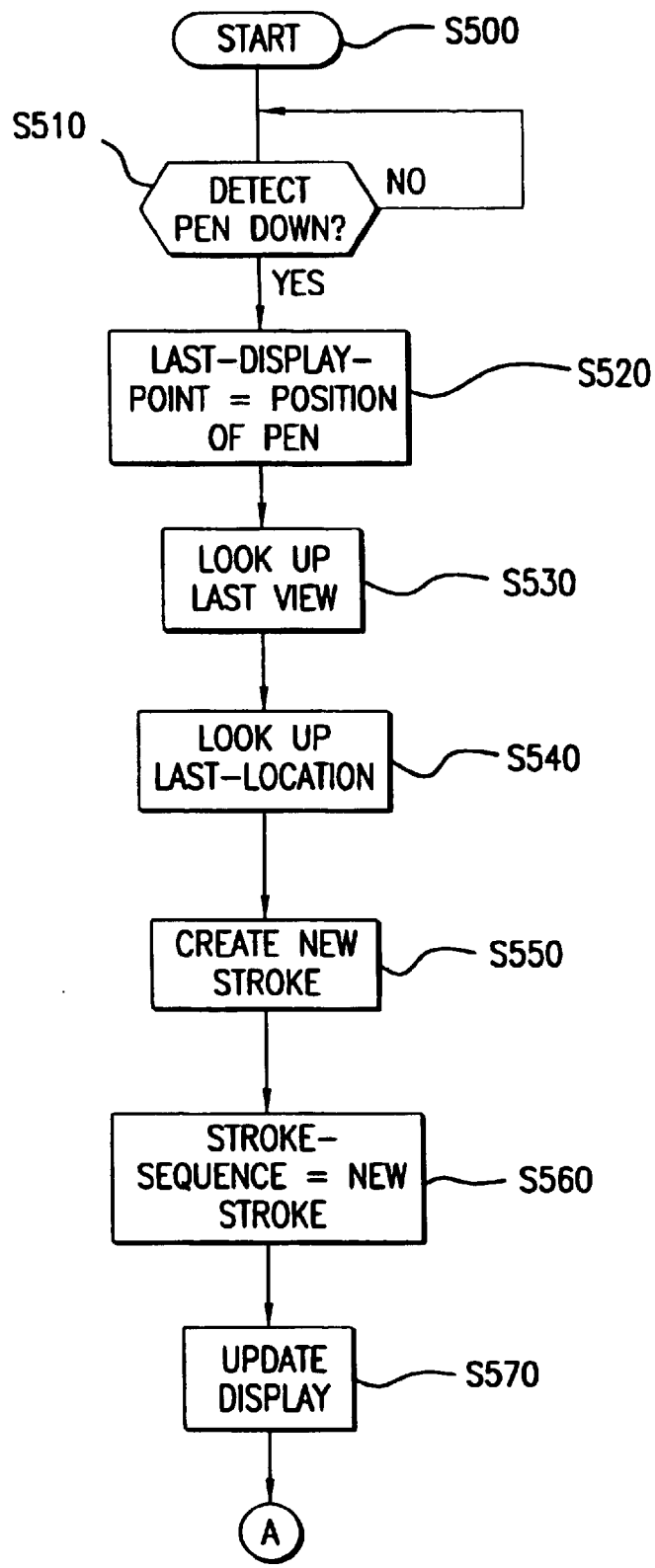
FIGS. 7A–7E show a flowchart outlining the control routine for generating links of one embodiment of a method of this invention.
Figure 7B:
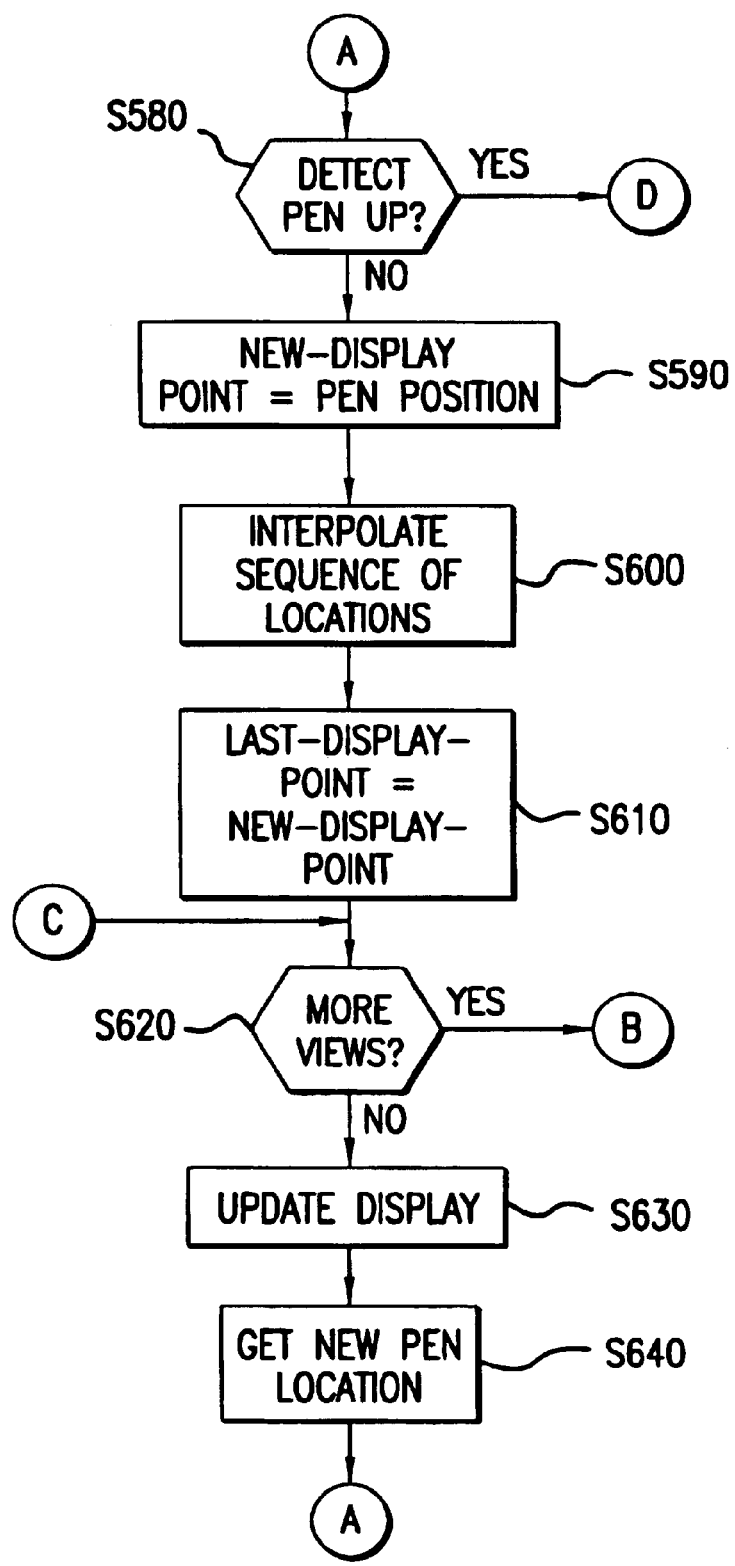
Figure 7C:
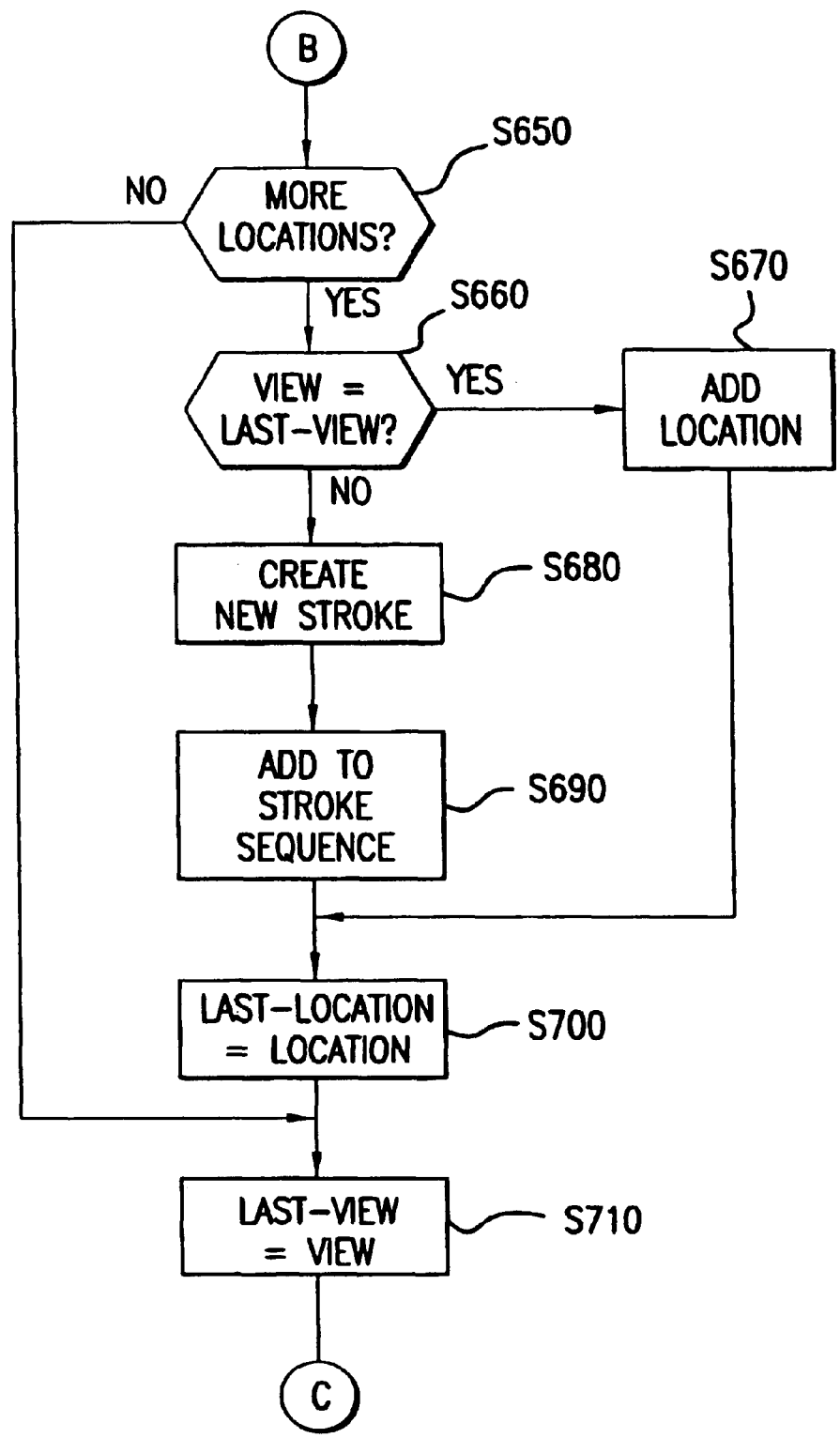
Figure 7D:
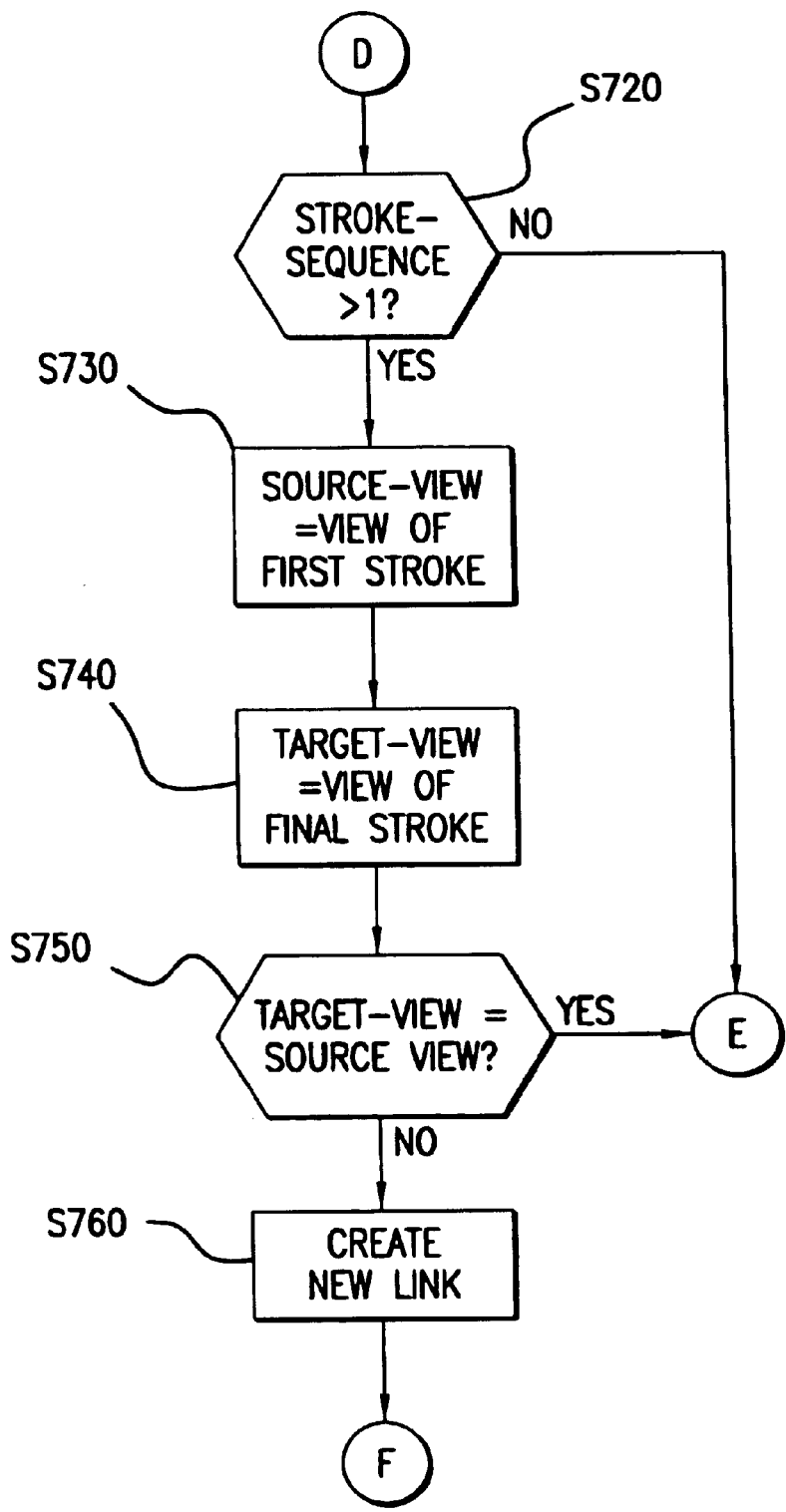
Figure 7E:
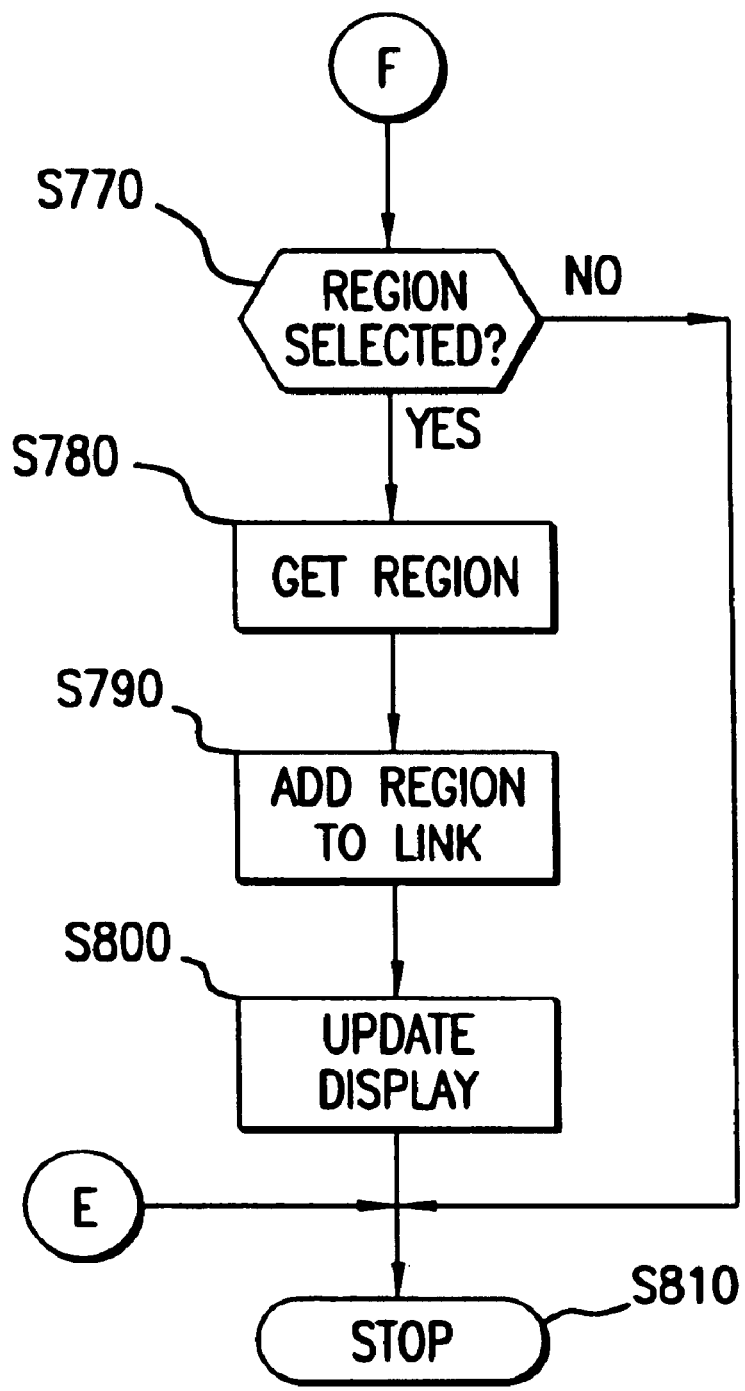

FIGS. 6A and 6B show a flowchart detailing a control routine for erasing and removing a link. The control routine starts at step S300, and continues to step S310. In step S310, the control routine determines whether an eraser has been selected. If in step S310, the control routine determines that an eraser has not been selected then the control routine jumps to step S420 where the control routine of FIGS. 6A and 6B ends. If in step S310, the control routine determines that an eraser has been selected, the control routine continues to step S320.

In step S320, the control routine determines whether a "pen tap" (or other selection) has been detected. If in step S320, the control routine determines that a "pen tap" has not been detected, then the control routine returns to step S320. If in step S320, the control routine determines that a "pen tap" has been detected, then the control routine continues to step S330.

In step S330, the control routine determines whether an ink stroke corresponds to the location of the "pen tap" in the annotation database. If in step S330, the control routine determines that no ink stroke matches the "pen tap" location, the control routine returns to step S320. If in step S330, the control routine determines that an ink stroke matching the "pen tap" location exists in the annotation database then the control routine continues to step S340.

In step S340 the control routine determines whether there is a link target in the link database that corresponds to the ink stroke. If in step S340, the control routine determines that there is no link target that corresponds to the ink stroke then the control routine continues to step S350. In step S350, the control routine removes the stroke from the ink annotation database and continues to step S410. If in step S340, the control routine determines that a link target in the link database does correspond to the ink stroke then the control routine continues to step S360.

In step S360, the control routine removes all ink strokes in the link target from the ink annotation database and continues to step S370. In step S370, the control routine removes the link target from the link and continues to step S380. In step S380, the control routine determines if the link is empty. If in step S380, the control routine determines that the link is not empty the control routine jumps to step S410. If in step S380, the control routine determines that the link is empty then the control routine continues to step S390.

In step S390, the control routine removes the link's ink anchor from the ink matching database and continues to step S400. In step S400, the control routine removes the link from the link database and continues to step S410. In step S410, the control routine updates the display and continues to step S420 where the control routine stops.

One embodiment of the linked notebook of this invention generates a two-way link from an ink stroke that crosses at least one window. The spatial characteristics of ink strokes allow the system to determine if an ink stroke crosses a window boundary. The spatial characteristics of an ink stroke include, for example, two-dimensional position information, location information within a document such as section page or chapter location and/or window position. The system of this invention creates a separate segment each time an ink stroke crosses a window boundary and the segments other than the first and last segment do not act as links.

The linked notebook system of this invention uses several additional data structures. A window is a region on the display that is dedicated to a particular view such as a page in a notebook or document. A window manager stores the current set of windows on the display with several operations such as look up a view and a location from a position on display, display a new view to the side of a specified existing view and interpolate a sequence of two-dimensional locations in views from a line (a pair of points) on the display by adding two points at each window boundary (one on each view). A copied region is a stroke, a region in a source view and a location in a target view.

FIGS. 7A–7E show a flowchart detailing a control routine for the link creation process for links that extend across windows. The control routine starts at step S500 and continues to step S510. At step S510, the control routine determines whether a "pen down" has been detected. If in step S510, the control routine determines that a "pen down" has not been detected the control routine returns to step S510. If in step S510, the control routine determines that a "pen down" has been detected then the control routine continues to step S520.

In step S520, the control routine sets the last-display-point to the position of the pen and continues to step S530. In step S530, the control routine looks up the last-view for the last-displayed-point using the window manager and continues to step S540. In step S540, the control routine looks up the last-location for the last-display-point using the window manager and continues to step S550. In step S550, the control routine creates a new stroke on the last-view starting at the last-location using the ink annotation database and continues to step S560.

In step S560, the control routine sets the stroke-sequence to the new stroke and continues to step S570. In step S570, the control routine updates the display and continues to step S580. In step S580, the control routine determines whether a "pen up" has been detected. If in step S580, a "pen up" has been detected then the control routine jumps to step S720. If in step S580, the control routine does not detect a "pen up" then the control routine continues to step S590.

In step S590, the control routine sets the new-display-point to the position of the pen and continues to step S600. In step S600, the control routine interpolates a sequence of locations in views from the line from the last-display-point to the new-display-point using the window manager and continues to step S610. In step S610, the control routine sets the last-display-point to the new-display-point and continues to step S620.

In step S620, the control routine determines whether there are more views in the sequence of locations. If in step S620, the control routine determines that there are no more views than the control routine continues to step S630. In step S630, the control routine updates the display and continues to step S640. In step S640, the control routine gets the new pen location and returns to step S580.

If the control routine determines, in step S620, that more views exist then the control routine continues to step S650. In step S650, the control routine determines whether there are more locations in the view. If in step S650, the control routine determines that there are no more locations than the control routine jumps to step S710.

If in step S650, the control routine determines that there are more locations then the control routine continues to step S660. In step S660, the control routine determines whether the view equals the last-view. If in step S660, the control routine determines that the view does equal the last-view then the control routine continues to step S670. In step S670, the control routine adds a location to the stroke and jumps to step S700. If in step S660, the control routine determines that the view does not equal the last-view then the control routine continues to step S680.

In step S680, the control routine creates a new stroke on the view starting at the location using the ink annotation database and continues to step S690. In step S690, the control routine adds the new stroke to the stroke-sequence and continues to step S700. In step S700, the control routine sets the last-location to the current location and continues to step S710. In step S710, the control routine sets the last-view to the current view and returns to step S620.

In step S720, the control routine determines whether the stroke-sequence contains more than one stroke. If in step S720, the control routine determines that the stroke-sequence does not contain more than one stroke then the control routine jumps to step S810. If in step S720, the control routine determines that the stroke-sequence contains more than one stroke, then the control routine continues to step S730.

In step S730, the control routine sets the source-view to the view of the first stroke in the sequence and continues to step S740. In step S740, the control routine sets the target-view to the view of the final stroke in the sequence and continues to step S750.

In step S750, the control routine determines if the target-view equals the source view. If the target-view equals the source view than the control routine jumps to step S810. If in step S750, the control routine determines that the target-view does not equal the source view then the control routine continues to step S760.

In step S760, the control routine creates a new link from the stroke-sequence using the link database and continues to step S770. In step S770, the control routine determines whether a region has been selected by the first stroke. In step S770, if no region has been selected then the control routine jumps to step S810. In step S770, if the control routine determines that a region has been selected then the control routine continues to step S780.

In step S780, the control routine gets the region that has been selected by the initial portion of the first stroke in the sequence and continues to step S790. In step S790, the control routine adds a copied region to the link that includes the first stroke, the region and the final location in the final stroke and continues to step S800. In step S800, the control routine updates the display and continues to step S810 where the control routine stops.

The system of the invention displays ink strokes across multiple windows when not all the windows are displayed by truncating the ink stroke. In other words, the system shows the ink stroke only where it was originally visible.

Additionally, the system of the invention may highlight ink strokes to indicate whether it acts as a link or not. For instance, the system of the invention may show ink strokes in gray which correspond to links to windows or pages which are not visible and may bold or use a different color for ink strokes which correspond to links to windows or pages which are visible.

Free-form ink annotation is intended to mean a visible ink stroke of arbitrary shape made with a pointing device that persists over time. The system infers some meaning from the shape or morphological characteristics of the ink stroke but does remove the ink stroke once it is recognized.

It is to be understood that the term document is intended to include text, video, audio and any other combination of media. Further, it is intended to be understood that the term text is intended to include text, digital ink, audio, video or any other content of a document to include the document's structure. It is also intended to be understood that ad-hoc links are links that are generated in response to and based upon a user's input of free-form ink rather than a link that is automatically generated such as hierarchical links or query-mediated links.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A method for providing multi-links from a first portion of a document to at least one second portion of at least one document, the method performed by a processor comprising:

generating a first anchor that provides for multi-way links in the first portion of the document;

generating a second anchor that provides for the multi-way links in the at least one second portion of the at least one document;

comparing and determining if at least one of a morphological characteristic and a spatial characteristic of the at least one free-form ink stroke related to the first anchor is similar to at least one of a corresponding morphological characteristic and a spatial characteristic of at least one free-form ink stroke related to the at least the second anchor and if similar then;

generating a multi-way link from the first anchor of the first portion of the document to the second anchor of at least one second portion of the at least one document;

maintaining the multi-way link from the first anchor of the first portion of the document to the second anchor of at least one second portion of the at least one document;

displaying the at least one free-form ink stroke related to the first portion of the document, the first portion of the document, the at least one free-form ink stroke related to the at least one second portion of the at least one document and the at least one second portion of the at least one document as annotations-in-context;

sorting the at least one free-form ink stroke related to the first portion of the document and the at least one free-form ink stroke related to the at least one second portion of the at least one document into a sorted order by date of creation before displaying, wherein the step of displaying comprises displaying in the sorted order.

2. The method of claim 1, wherein the first portion of the document is in the same document as the at least one second portion of the at least one document.

3. The method of claim 1, wherein the first portion of the document is in a different document than the at least one second portion of the at least one document.

4. The method of claim 1, the at least one morphological characteristic being the at least one free-form ink stroke crossing a window boundary.

5. The method of claim 1, further comprising:
determining if the at least one free-form ink stroke represents a callout; and
copying the first portion of the document onto the at least one second portion of the at least one document.

6. The method of claim 5, the callout comprising a circle around the first portion of the document and a line to the at least one second portion of the at least one document.

7. The method of claim 1, wherein at least one second portion comprises a plurality of second portions of the at least one document and the link is from the first portion of the document to each of the plurality of second portions.

8. The method of claim 1, wherein the link is a selectable link that is displayed in the document of the first portion and further comprising displaying the at least one second portion of the at least one document in response to a selection of the selectable link.

9. The method of claim 1, wherein the step of determining comprises:
determining whether the at least one free-form ink stroke related to the first portion of the document is a free-form ink stroke around at least one first ink stroke;
determining whether the at least one free-form ink stroke related to the at least one second portion of the at least one document is a free-form ink stroke around at least one second ink stroke;
determining whether the at least one of a morphological characteristic and a spatial characteristic of the at least one free-form ink stroke related to the first portion of the document is a corresponding one of a morphological characteristic and a spatial characteristic of the at least one first ink stroke; and
determining whether the at least one of a morphological characteristic and a spatial characteristic of the at least one free-form ink stroke related to the at least one second portion of the at least one document is a corresponding one of a morphological characteristic and a spatial characteristic of the at least one second ink stroke.

10. The method of claim 9 the free-form ink stroke around the at least one first ink stroke being a circle and the free-form ink stroke around the at least one second ink stroke being a circle.

11. The method of claim 1, the number of the at least one free-form ink strokes being displayed being limited in accordance with a user preference.

12. A method of claim 1, further comprising:
detecting a selection of a free-form ink stroke representing the link;
removing the link corresponding to the free-form ink stroke; and
maintaining the first portion of the document and the at least one second portion of at least one document.

13. An electronic document system for providing multi-links from a first portion of a document to at least one second portion of at least one document, comprising:
a processor that generates a first anchor that provides for multi-way links in the first portion of the document;
a pen based input device that receives at least one free-form ink stroke, the pen based input device including a pen based display;
the processor that generates a second anchor that provides for multi-way links in the at least one second portion of the at least one document,
the processor that compares and determines if the first anchor and the second anchor have at least one of a morphological characteristic and a spatial characteristic of the at least one free-form ink stroke that is similar and if similar then;
the processor generates a multi-way link from the first anchor of the first portion of the document to the second anchor of at least one second portion of the at least one document, the processor maintains the multi-way link from the first anchor of the first portion of the document to the second anchor of at least one second portion of the at least one document,
wherein the display is responsive to the selection of the selectable link to display at least one free-form ink stroke related to the first portion of the document, the first portion of the document, the at least one free-form ink stroke related to the at least one second portion of the at least one document and the at least one second portion of the at least one document as annotations-in-context, and
wherein the processor sorts by date of creation the at least one free-form ink stroke related to the first portion of the document and the at least one free-form ink stroke related to the at least one second portion of the at least one document and the display is responsive to a selection of the selectable link to display the at least one free-form ink stroke related to the first portion of the document and the at least one free-form ink stroke related to the at least one second portion of the at least one document in sorted order;
wherein the processor generates a selectable link and the pen based display is responsive to a selection of the selectable link to display the at least one second portion of the at least one document.

14. The system of claim 13, wherein the first portion of the document is in the same document as the at least one second portion of the at least one document.

15. The system of claim 13, wherein the first portion of the document is in a different document than the at least one second portion of the at least one document.

16. The system of claim 13, the at least one morphological characteristic being at least one free-form ink stroke crossing a window boundary.

17. The system of claim 13, wherein the processor determines if the at least one free-form ink stroke represents a callout; and copies the first portion of the document onto the at least one document of the at least one second portion of the at least one document in response to a determination that the at least one free-form ink stroke represents a callout.

18. The system of claim 13, wherein the processor is responsive to a determination from the at least one of the morphological characteristic and a spatial characteristic of the at least one free-form ink stroke that the at least one free-form ink stroke represents a link between the first portion of the document and a plurality of second portions of the at least one document for generating a link from the first portion of the document to the plurality of second portions of the at least one document.

19. The system of claim 13, wherein the display is responsive to the selection of the selectable link to display at least one free-form ink stroke related to the first portion of the document, the first portion of the document, the at least one free-form ink stroke related to the at least one second portion of the at least one document and the at least one second portion of the at least one document as annotations-in-context.

20. The system of claim 13, the display for displaying a number of the at least one free-form ink strokes that is limited in accordance with a user preference.

21. The system of claim 13, wherein the processor generates a link in response to a determination that at least one of a morphological characteristic and a spatial characteristic of the at least one free-form ink stroke related to the first portion of the document is similar to at least one of a corresponding morphological characteristic and a spatial characteristic of at least one free-form ink stroke related to-the at least one second portion of the at least one document.

22. The system of claim 21, wherein the processor generates a link if;

the at least one free-form ink stroke related to the first portion of the document is a free-form ink stroke around at least one first ink stroke;

the at least one free-form ink stroke related to the at least one second portion of the at least one document is a free-form ink stroke around at least one second ink stroke;

the at least one of a morphological characteristic and a spatial characteristic of the at least one free-form ink stroke related to the first portion of the document is a corresponding one of a morphological characteristic and a spatial characteristic of the at least one first ink stroke; and the at least one of a morphological characteristic and a spatial characteristic of the at least one free-form ink stroke related to the at least one second portion of the at least one document is a corresponding one of a morphological characteristic and a spatial characteristic of the at least one second ink stroke.

23. The system of claim 22, wherein the processor generates a link if the free-form ink stroke around the at least one first ink stroke is a circle and the free-form ink stroke around the at least one second ink stroke is a circle.

24. A system of claim 13, further comprising:

a pen based input that receives a pen tap;

a processor responsive to the pen tap occurring on a free-form ink stroke that corresponds to the multi-way link, wherein the processor removes the multi-way link and maintains the first portion of the document and the at least one second portion of the at least one document.

\* \* \* \* \*